US012801174B2

(12) United States Patent
Melikyan et al.

(10) Patent No.: US 12,801,174 B2
(45) Date of Patent: Nov. 17, 2026

(54) CURRENT BIASING WITH FAST STARTUP AND AGGRESSIVE VOLTAGE SCALING

(71) Applicant: QUALCOMM Incorporated, San Diego, CA (US)

(72) Inventors: Tigran Melikyan, Carrigaline (IE); Hayk Revazyan, Cobh (IE); Ashwin Sethuram, San Clemente, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 18/988,799

(22) Filed: Dec. 19, 2024

(65) Prior Publication Data

US 2026/0178067 A1 Jun. 25, 2026

(51) Int. Cl.
*G05F 3/00* (2006.01)
*G05F 3/26* (2006.01)

(52) U.S. Cl.
CPC .................................... *G05F 3/262* (2013.01)

(58) Field of Classification Search
CPC ..... G05F 3/20; G05F 3/08; G05F 3/26; G05F 3/262; G05F 3/267; G05F 3/16; G05F 1/10; G05F 1/46; G05F 1/561
See application file for complete search history.

(56) References Cited

U.S. PATENT DOCUMENTS 7,015,744 B1 * 3/2006 Holloway ............... G05F 3/262 327/543
9,851,740 B2 12/2017 Song et al.
2007/0075766 A1 * 4/2007 Garcia .................... G05F 3/262 327/543
2018/0081386 A1 * 3/2018 Draxelmayr ............ G05F 3/267
2022/0035506 A1 * 2/2022 Zou ......................... G05F 3/262
2024/0241534 A1 * 7/2024 Jain ......................... G05F 3/262
2026/0016846 A1 * 1/2026 Chang ....................... G05F 1/56

FOREIGN PATENT DOCUMENTS

CN 104615184 A * 5/2015

* cited by examiner

*Primary Examiner* — Tuan T Lam
(74) *Attorney, Agent, or Firm* — QUALCOMM Incorporated

(57) ABSTRACT

A constant-transconductance bias circuit is provided that includes a PMOS current mirror cross-coupled with an NMOS current mirror. The PMOS and NMOS current mirrors drive a first current through a first current path and a second current through a second current path. A resistor in the first current path introduces an ohmic voltage drop from a gate voltage of a diode-connected PMOS transistor in the PMOS current mirror to provide a bias voltage. The bias voltage biases a gate of a PMOS transistor in the second current path.

20 Claims, 6 Drawing Sheets

CURRENT BIASING WITH FAST STARTUP AND AGGRESSIVE VOLTAGE SCALING

TECHNICAL FIELD

This application relates to biasing circuits, and more particularly to a current biasing circuit with fast startup and aggressive voltage scaling.

BACKGROUND

To save power, an integrated circuit such as a system-on-a-chip (SoC) may vary the power supply voltage for various power domains across a wide operating range. For example, a processor power domain may not only vary the power supply voltage but also the processor clocking frequency in what is denoted as dynamic voltage frequency scaling (DVFS). An aggressive (wide operating scale) DVFS saves substantial amounts of power as the processor power supply voltage and clocking frequency may be reduced during idle modes, yet high performance is retained by increasing the power supply voltage and clocking frequency during active modes. But the resulting usage of aggressive DVFS introduces challenges to the design of bias circuits for biasing input/output circuits.

SUMMARY

In accordance with an aspect of the disclosure, a constant-transconductance bias circuit is provided that includes: a p-type metal-oxide semiconductor (PMOS) current mirror configured to mirror a first current into a second current, the PMOS current mirror including a first PMOS transistor and a second PMOS transistor; an n-type metal-oxide semiconductor (NMOS) current mirror configured to mirror the second current into the first current, the NMOS current mirror including a first NMOS transistor and a second NMOS transistor; a first resistor having a first terminal coupled to a drain of the second NMOS transistor; a third PMOS transistor coupled between a drain of the first PMOS transistor and a second terminal of the first resistor; and a second resistor having a first terminal coupled to a drain of the second PMOS transistor and having a second terminal coupled to a drain of the first NMOS transistor and coupled to a gate of the third PMOS transistor.

In accordance with another aspect of the disclosure, a method of generating a bias voltage from a constant-transconductance bias circuit is provided that includes: conducting a first current through a first NMOS transistor in an NMOS current mirror responsive to a conduction of a second current through a second NMOS transistor in the NMOS current mirror; conducting the second current through a first PMOS transistor in a PMOS current mirror responsive to a conduction of the first current through a second PMOS transistor in the PMOS current mirror; generating a bias voltage by conducting the second current through a first resistor coupled to a drain of the first PMOS transistor; varying a power supply voltage that powers the constant-transconductance bias circuit in response to a dynamic voltage frequency scaling; and biasing a gate of a third PMOS transistor coupled to a drain of the second PMOS transistor with the bias voltage to reduce a channel length modulation of the second PMOS transistor resulting from the varying of the power supply voltage.

In accordance with yet another aspect of the disclosure, a bias circuit is provided that includes: a PMOS current mirror configured to mirror a first current into a second current, the PMOS current mirror including a first PMOS transistor and a second PMOS transistor; an NMOS current mirror configured to mirror the second current into the first current, the NMOS current mirror including a first NMOS transistor and a second NMOS transistor; a first resistor coupled between a gate of the second NMOS transistor and a drain of the second NMOS transistor; and a third NMOS transistor coupled between a drain of the first NMOS transistor and a drain and a gate of the second PMOS transistor, wherein a gate of the third NMOS transistor is coupled to the gate of the second NMOS transistor.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

To provide improved performance, an input circuit for an integrated circuit may receive a calibrated current. The input circuit (which may also be denoted as a receiver) determines the binary state of input signals using the calibrated current. The design of a bias circuit to provide the calibrated current in an aggressive DVFS architecture faces several challenges. For example, a resistive ladder bias circuit may be used to divide a power supply voltage using a resistive ladder formed by a variable resistor in series with a diode-connected transistor. Depending upon the resistance of the variable resistor, a variable resistive ladder current conducted by the diode-connected transistor is varied accordingly. A first current mirror mirrors the resistive ladder current to produce a mirrored current that conducts through a fixed resistor coupled to a node for an input/output (IO) power supply voltage (VDDIO). Depending upon the variable resistance of the variable resistor (which in turn varies the magnitude of the resistive ladder current), the fixed resistor provides a voltage that is reduced from the IO power supply voltage by an ohmic drop equaling a product of the resistance of the fixed resistor and the mirrored current. A comparator compares the reduced voltage to a reference voltage that equals a known proportion of the IO power supply voltage. A suitable controller such as a finite state machine (FSM) may then calibrate the resistance of the variable resistor until the reduced voltage equals the reference voltage. The result is that the resistive ladder current has a known value. Additional current mirrors may then be used to mirror the resistive ladder current to provide calibrated bias currents for corresponding receivers.

But note that the IO power supply voltage VDDIO may have its magnitude varied depending upon the DVFS mode. If the resistive ladder were to divide the IO power supply voltage VDDIO, the resistive ladder current would have an undesirable wide variation for a given resistance of the variable resistor. It is thus traditional that the resistive ladder divides a fixed power supply voltage. But such a fixed power supply voltage (not subject to DVFS) typically results in a power supply voltage magnitude that is too high such that thick-oxide transistors are required to form the resistive ladder. Should a process node not support thick-oxide devices, the resistive ladder approach may become untenable.

Figure 1:
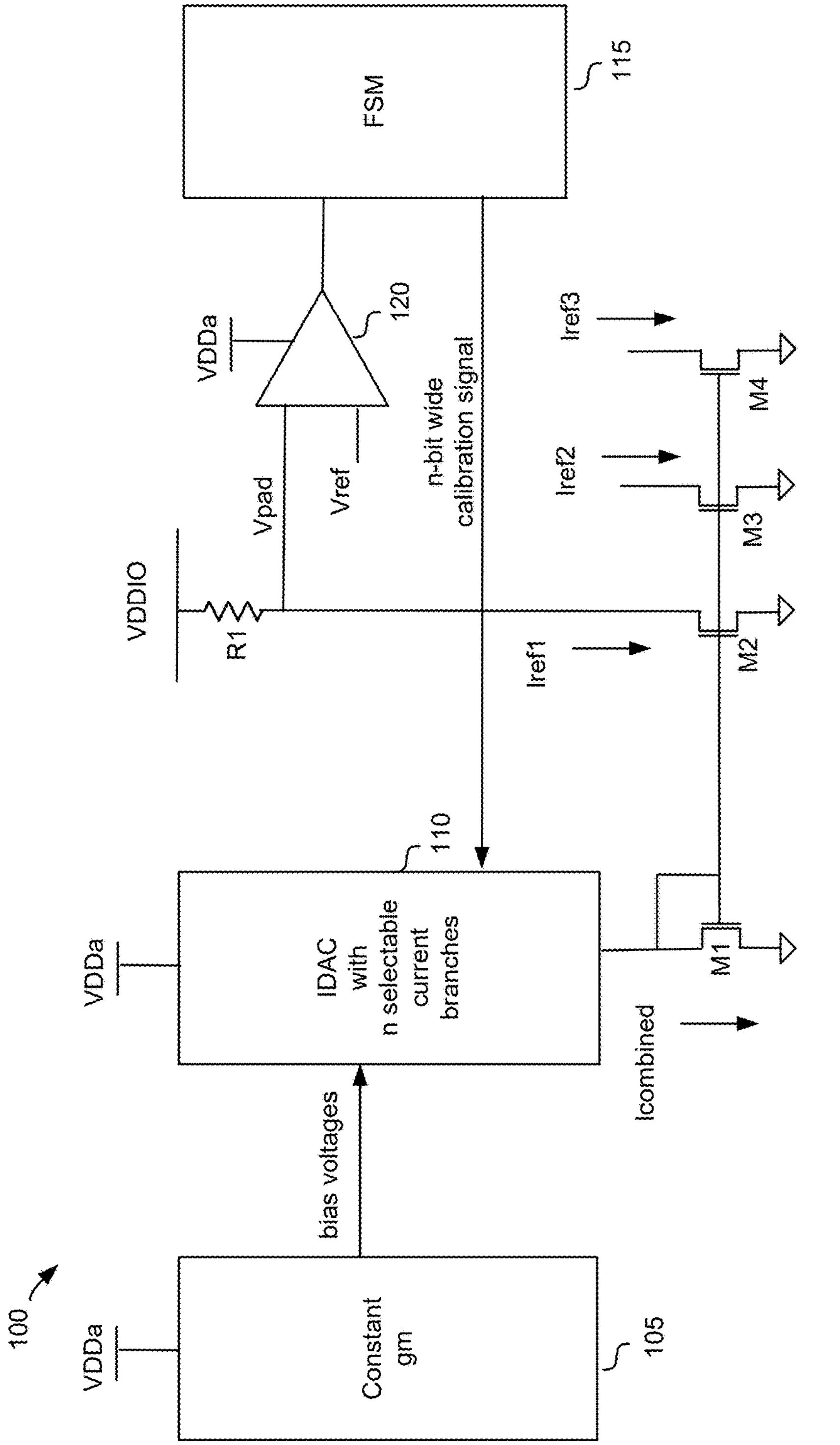
FIG. 1 illustrates a bias current generator in accordance with an aspect of the disclosure.

To advantageously generate a calibrated current accurately without needing thick-oxide devices, a bias current generator that includes a constant-transconductance (gm) bias circuit is disclosed herein. An example bias current generator 100 is shown in FIG. 1. A constant-transconductance (constant-gm) bias circuit 105 generates bias voltages for a current digital-to-analog converter IDAC 110. Both the constant-gm bias circuit 105 and the IDAC 110 are powered by a power supply voltage VDDa that may be subjected to an aggressive DVFS. Despite the DVFS variations in the power supply voltage VDDa, the power supply voltage VDDa does not vary to a magnitude that would require thick-oxide transistors. The constant-gm bias circuit 105 and the IDAC 110 may thus both be constructed using thin-oxide devices such that process nodes that don't support thick-oxide devices may be advantageously used to construct an integrated circuit including the bias current generator 100. As will be explained further herein, the IDAC 110 includes a plurality of n selectable current paths that are either selected to conduct or not selected to conduct by an n-bit wide calibration signal from a suitable controller such as a finite state machine (FSM) 115, where n is a positive plural integer. Each selectable current path includes one or more current path transistors that conduct a current responsive to the bias voltages. Since the current path transistors are matched to corresponding transistors in the constant-gm bias circuit 105, the current path transistors in the activated current paths will also conduct with a constant transconductance. A combined current Icombined from the activated current paths conducts through a diode-connected n-type metal-oxide semiconductor (NMOS) transistor M1 having its source coupled to ground that forms a current mirror with an NMOS reference transistor M2 also having its source coupled to ground. A reference current Iref1 that conducts through the reference transistor M2 into ground will thus be a mirrored version of the current Icombined conducted by the diode-connected transistor M1. The relative sizes (width and length) of the diode-connected transistor M1 and the reference transistor M2 determine a proportionality between the Icombined and Iref1 currents.

The current Iref1 conducts through a resistor R1 having a first terminal coupled to a power supply node for an IO power supply voltage VDDIO. A voltage Vpad that develops at a second terminal of the resistor R1 will be a product Iref1*R1 lower than the IO power supply voltage VDDIO, where R1 is the resistance of the resistor R1. A comparator 120 that is also powered by the power supply voltage VDDa (thus allowing the comparator 120 to be constructed using thin-oxide devices) compares the voltage Vpad to a reference voltage Vref that equals a proportion of the IO power supply voltage VDDIO (e.g., 0.75*VDDIO) such as generated by a bandgap reference (not illustrated). The FSM 115 controls the calibration signal to activate the appropriate number of current paths in the IDAC 110 to vary the voltage Vpad so as to be substantially equal to the reference voltage Vref. Depending upon the resistance R1, the reference current Iref1 may thus be calibrated to a known value (e.g., 25 μA) that is advantageously constant over process, voltage, and temperature corners.

Since the diode-connected transistor M1 has its gate coupled to the gates of additional NMOS transistors such as transistors M3 and M4 that also have their sources coupled to ground, these additional transistors form current mirrors with the diode-connected transistor M1. The transistor M3 will thus conduct a calibrated reference current Iref2. Similarly, the transistor M4 conducts a calibrated reference current Iref3. These calibrated reference currents may be used in corresponding receivers (not illustrated) for the processing of input signals by the receivers that is advantageously stable over process, voltage, and temperature corners. But this stability depends upon the stability of the constant transconductance of the constant-gm bias circuit 105. An aggressive DVFS scaling of the power supply voltage VDDa (e.g., from 0.5V to 0.9V) makes achieving this stability challenging.

Figure 2:
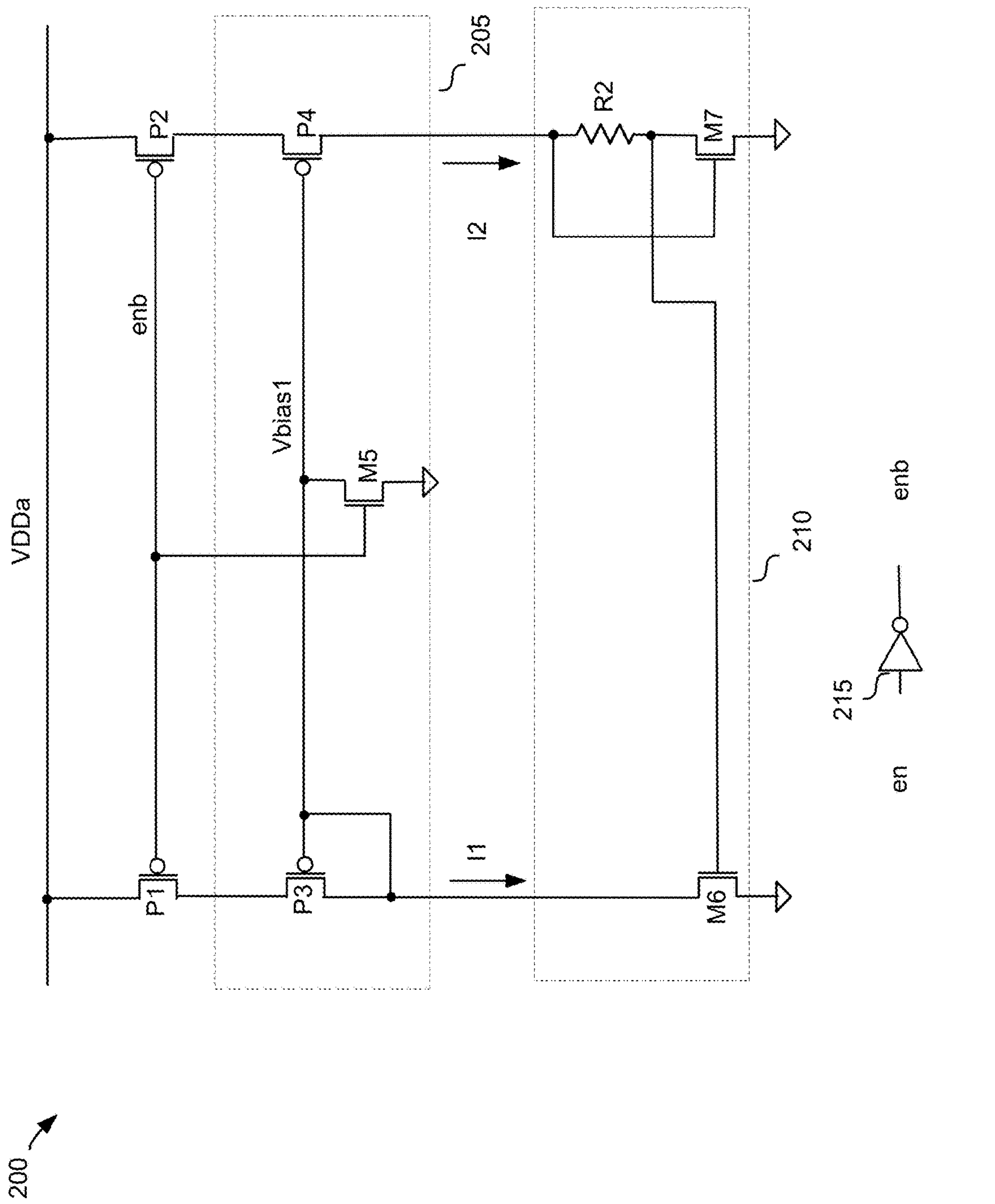
FIG. 2 illustrates a constant-transconductance bias circuit.

To provide a better appreciation of these challenges, a typical constant-gm bias circuit architecture will first be discussed followed by a discussion of an advantageously stable constant-gm bias circuit architecture disclosed herein. To provide bias voltages that are independent of the power supply voltage, a bias circuit may use a p-type metal-oxide semiconductor (PMOS) current mirror and an NMOS current mirror. The PMOS current mirror mirrors a first current conducted over a first current path into a second current conducted over a second current path. In turn, the NMOS current mirror mirrors the second current conducted over the second current path into the first current conducted over the first current path. The NMOS and PMOS current mirrors are thus cross coupled to mirror the first and second currents to each other. An example bias circuit 200 is shown in FIG. 2. A PMOS current mirror 205 includes a diode-connected PMOS transistor P3 having its gate coupled to a gate of a PMOS transistor P4. A source of the diode-connected transistor P3 couples to a power supply node for the variable power supply voltage VDDA through a PMOS transistor P1. Similarly, a source of the transistor P4 couples to the power supply node through a PMOS transistor P2. A complement enable signal (enb) drives the gates of the transistors P1 and P2. In an inactive mode for the bias circuit 200, an enable signal (en) is grounded such that the complement enable signal is charged to the power supply voltage VDDa as produced by an inverter 215 that inverts the enable signal. In the active mode, the enable signal is charged to the power supply voltage VDDa, which causes the complement enable signal to be discharged to ground. During the inactive mode, the charging of the complement enable signal switches off the transistors P1 and P2 and thus prevents the PMOS current mirror 205 from conducting any current. To speed up a transition to an active mode for the bias circuit 200, the complement enable signal also drives a gate of an NMOS transistor M2 having a source coupled to ground and a drain coupled to the gates of the diode-connected transistor P3 and the transistor P4. The diode-connected transistor P3 and the transistor P4 are thus both on (albeit not conducting any significant current) during the inactive mode. At the transition to the active mode, the already-on state of the diode-connected transistor P3 and the transistor P4 assists the PMOS current mirror 205 to begin conducting current more quickly.

During the active mode for the bias circuit 200, the diode-connected transistor P3 conducts a first current I1 into the drain of an NMOS transistor M6 in an NMOS current mirror 210. The PMOS current mirror 205 thus mirrors the first current I1 into a second current I2 conducted by the transistor P4. In the NMOS current mirror 210, the second current I2 conducts through an NMOS transistor M7. The gate of the transistor M6 couples to a drain of the transistor M7. The sources of the transistors M6 and M7 are both coupled to ground. A resistor R2 couples between the drain of the transistor M7 and a drain of the transistor P4. The resistor R2 is also denoted herein as a first resistor. The gate of the transistor M7 couples to the drain of the transistor P4 such that the transistor M7 is effectively diode connected. The NMOS current mirror 210 thus mirrors the current I2 conducted by the transistor M7 into the current I1 conducted by the transistor M6. In sum, the PMOS current mirror 205 and the NMOS current mirror 210 are cross coupled because the PMOS current mirror 205 mirrors the current I1 into the current I2 whereas the NMOS current mirror 210 mirrors the current I2 into the current I1. If the transistors P3 and P4 in the PMOS current mirror 205 are both the same size (e.g., a same ratio of width to length), the currents I1 and I2 are equal. Given the cross coupling of the current mirrors 205 and 210 and the presence of the resistor R2, it can be shown that the current I1 (and thus the current I2) is proportional to an inverse of a square of a resistance of the resistor R2 and is relatively independent of the power supply voltage VDDa. A transconductance of the transistor P4 is thus relatively constant. A bias voltage Vbias1 that develops at the gate of the transistor P4 may then drive a gate of a matched PMOS transistor in a current branch of the IDAC 110 as will be explained further herein. The matched transistor in the IDAC current branch will then also conduct with a constant transconductance despite minor variations in the power supply voltage VDDa.

Figure 3:
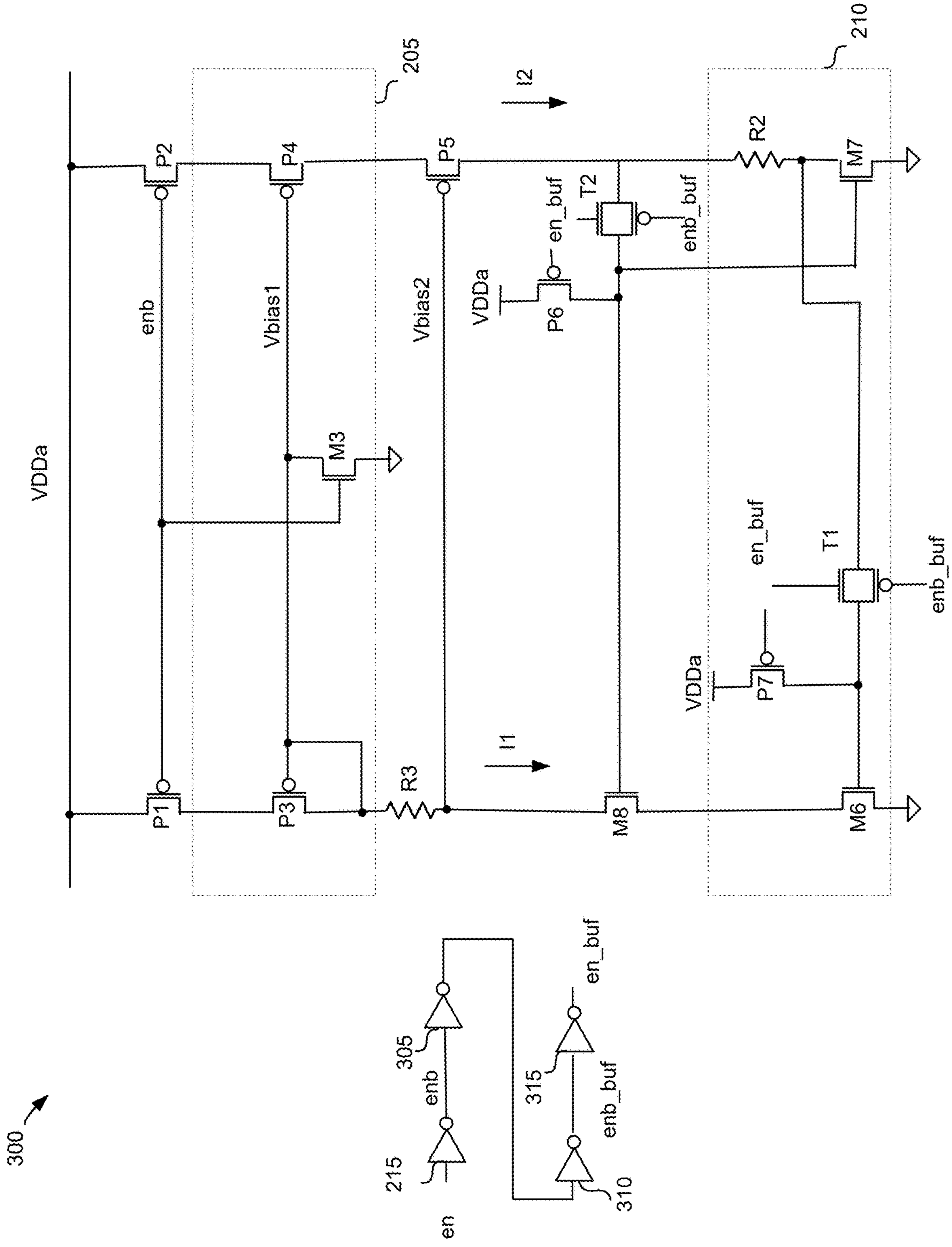
FIG. 3 illustrates an improved constant-transconductance bias circuit in accordance with an aspect of the disclosure.

But the supply voltage independence of the currents I1 and I2 may degrade due to a channel length modulation of the transistors P4 and M6 should the power supply voltage VDDa be subjected to an aggressive DVFS such as ranging from approximately 0.5V to 0.9V. As shown in FIG. 3, an improved bias circuit 300 is disclosed that has an advantageous constant transconductance despite an aggressive DVFS scaling of the power supply voltage VDDa. The bias circuit 300 includes the PMOS current mirror 205 and the NMOS current mirror 210 that are cross coupled as discussed with respect to the bias circuit 200. The transistor P4 may also be denoted herein as a first PMOS transistor. Similarly, the diode-connected transistor P3 may also be denoted herein as a second PMOS transistor. Should the diode-connected transistor P3 and transistor P4 both have the same size, the current I1 conducted by the diode-connected transistor P3 will thus be equal to the current I2 conducted by the effectively diode-connected transistor M7. The transistor M6 may also be denoted herein as a first NMOS transistor. Similarly, the effectively diode-connected transistor M7 may also be denoted herein as a second NMOS transistor. To address the channel length modulation of the transistor P4, a PMOS transistor P5 that couples between a drain of the transistor P4 and the resistor R2 is inserted into the I2 current path. The transistor P5 is also denoted herein as a third PMOS transistor.

A biasing of a gate of the transistor P5 takes advantage of a relative constant voltage difference that exists between the power supply voltage VDDa and the bias voltage Vbias1 at the gate of the transistor P4. Should the gate of transistor P5 be biased by the bias voltage Vbias1, transistors P5 and P4 would merely function as a larger version of transistor P4. A bias voltage Vbias2 at the gate of the transistor P5 is thus developed by the insertion of a resistor R3 in the I1 current path at the drain of the diode-connected transistor P3. The resistor R3 is also denoted herein as a second resistor or as a first resistor. The bias voltage Vbias2 will thus be lower than the bias voltage Vbias1 by a product of the current I1 and a resistance of the resistor R3. The resulting biasing of the transistor P5 causes a source voltage of the transistor P5 to be relatively constant despite the variations in the power supply voltage VDDa. A source-to-drain voltage of the transistor P4 is thus relatively constant despite the variation of the power supply voltage VDDa, which reduces the channel length modulation of the transistor P4 such that the transistor P4 has a substantially constant transconductance.

A reduction in the channel length modulation of the transistor M6 is analogous in that it also takes advantage of the relative constant difference between the power supply voltage VDDa and the drain voltage of the transistor P5. During the active mode of the bias circuit 300, the drain voltage of the transistor P5 biases a gate of an NMOS transistor M8 that is inserted in the I1 current path between the resistor R3 and the drain of the transistor M6. The resulting biasing of the transistor M8 causes a source voltage of the transistor M8 to be relatively constant despite the variations in the power supply voltage VDDa. A drain-to-source voltage of the transistor M6 is thus relatively constant, which reduces the channel length modulation of the transistor M6 such that the transistor M6 has a substantially constant transconductance. The transistor M8 is also denoted herein as a third NMOS transistor.

In addition to the improved constant transconductance, bias circuit 300 is modified to provide a faster transition to the active mode. In the inactive mode, the enable signal (en) is grounded such that the complement enable signal enb is charged to the power supply voltage VDDa as produced by the inverter 215 that inverts the enable signal. In the active mode, the enable signal is charged to the power supply voltage VDDa such that the complement enable signal is discharged to ground. As discussed for the bias circuit 200, the complement enable signal drives the gates of the transistors P1, P2, and M5. The transistors P3 and P4 in the PMOS current mirror 205 are thus on during the inactive mode but cannot conduct any current due to the off state of the transistors P1 and P2. Since there is no ohmic voltage drop across the transistor R3 during the inactive mode, the coupling of the gate of the transistor P3 through the resistor R3 to the gate of the transistor P5 causes the transistor P5 to also be on during the inactive mode. At the transition to the active mode in which the complement enable signal is grounded to switch on the transistors P1 and P2, the already-on state of the transistors P3, P4, and P5 aids in a faster transition from the inactive mode to the active mode.

To further increase the transition speed from the inactive mode to the active mode, transistor M6 is switched on during the inactive mode through a PMOS transistor P7 having its source coupled to a node for the power supply voltage VDDa and a drain coupled to the gate of the transistor M6. To control the transistor P7, a pair of inverters 305 and 310 buffer the complement enable signal to produce a buffered complement enable signal (enb_buf). Another inverter 315 inverts the buffered complement enable signal to produce a buffered enable signal (en_buf). The buffered enable signal drives a gate of the transistor P7 such that the transistor P7 is on during the inactive mode, which in turn switches on the transistor M6. Similarly, a PMOS transistor P6 has its source coupled to the power supply node and a drain coupled to the gates of the transistor M8 and M7. The buffered enable signal drives a gate of the transistor P6 so that the transistors M7 and M8 are both on during the inactive mode. The on state of the transistor M6, M7, and M8 during the inactive mode allows these transistors to more quickly conduct in the transition to the active mode.

To further speed up the transition from the inactive mode to the active mode, the biasing of the gate of the transistor M8 by the drain voltage of the transistor P5 during the active mode is initially disabled through a transmission gate T2 that has an NMOS transistor side controlled by the buffered enable signal and a PMOS transistor side controlled by the buffered complement enable signal. The transmission gate T2 is thus open during the inactive mode and will remain open at the transition to the active mode during an inverter propagation delay through the inverters chain formed by the inverters 215, 305, 310, and 315. After the inverter propagation delay has expired at the transition to the active mode, the transmission gate T2 closes so that the gate of the transistor M8 is biased by the drain voltage of the transistor P5. In addition, the transmission gate T2 intervenes between the gate of the transistor M7 and the drain of the transistor P5. The effective diode connection of the transistor M7 is thus not established until the propagation delay through the inverter chain has expired. The resulting propagation delay at the beginning of the active mode allows intermediate voltages to develop in the bias circuit 300 to speed the transition from the inactive mode to the active mode. The propagation delay is relatively short (e.g., 10 to 20 picoseconds), which further decreases the transition time from the inactive mode to the active mode for the bias circuit 300.

A similar transmission gate T1 intervenes between the gate of the transistor M6 and the drain of the transistor M7. The transmission gate T2 has an NMOS transistor side controlled by the buffered enable signal and a PMOS transistor side controlled by the buffered complement enable signal. The transmission gate T2 is thus open during the inactive mode and will remain open at the transition to the active mode during the inverter propagation delay. At the expiration of the propagation delay, the transmission gate T2 closes so that the NMOS current mirror 210 may function as discussed earlier. But the opening of the transmission gate T1 during the propagation delay aids in the development of intermediate voltages in the bias circuit 300 to further reduce the transition time from the inactive mode to the active mode.

Figure 4:
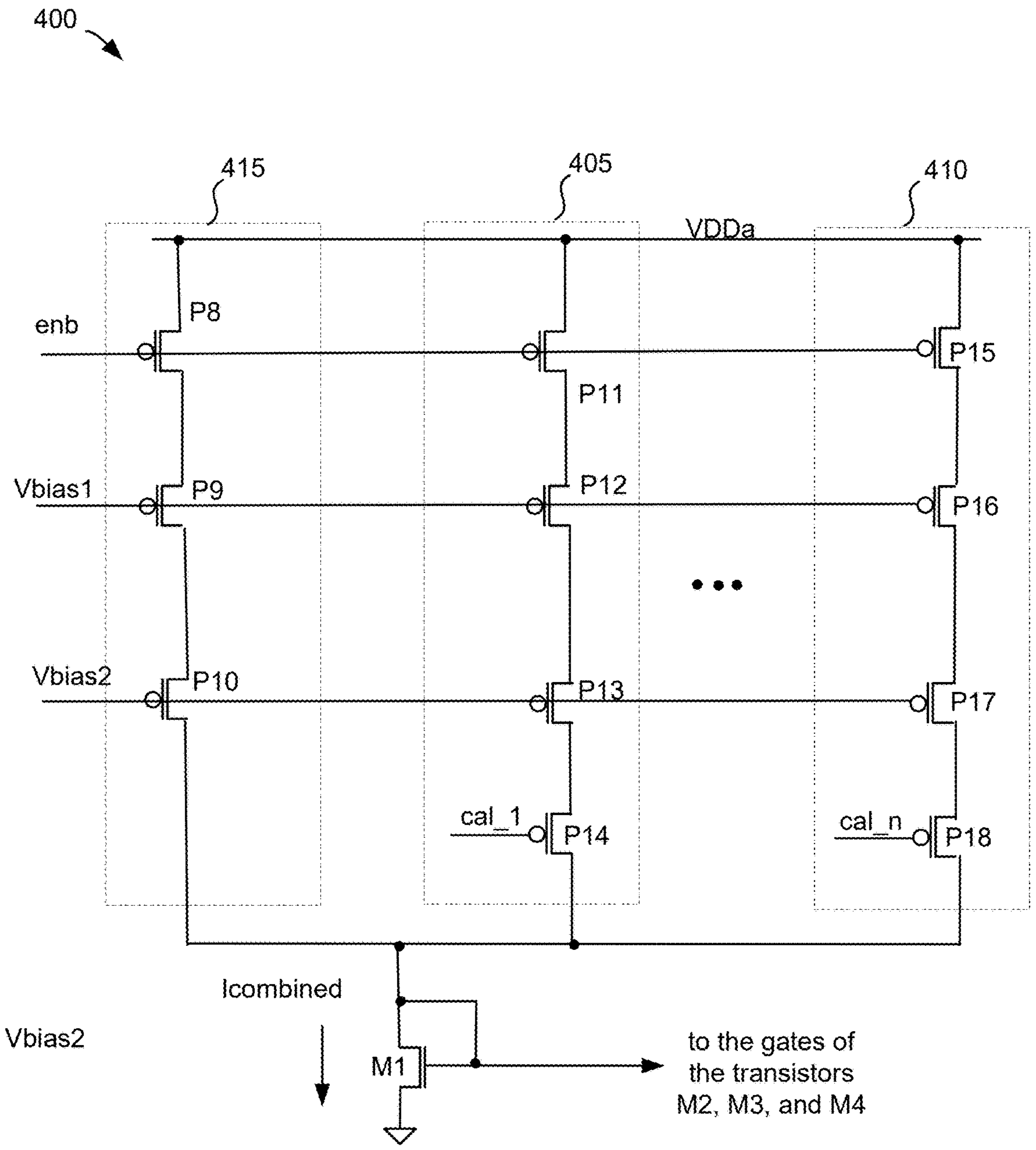
FIG. 4 is a more detailed view of the IDAC in the bias current generator of FIG. 1 in accordance with an aspect of the disclosure.

Due to the constant transconductance of the transistors P4 and P5, the bias voltages Vbias1 and Vbias2 may be used to drive the gates of corresponding current path transistors in current branches of the IDAC 110 such that these corresponding transistors also have a relatively constant transconductance despite an aggressive DVFS scaling of the power supply voltage VDDa. An example IDAC 400 is shown in more detail in FIG. 4. A fixed (always conducting during the active mode) current branch 415 includes a PMOS transistor P8 having a gate coupled to the power supply node for the power supply voltage VDDa and having a gate controlled by the complement enable signal. The transistor P8 is thus off during the inactive mode and switches on during the active mode. A drain of the transistor P8 couples to a source of a PMOS transistor P9 that may be matched to the transistor P4. The bias voltage Vbias1 drives a gate of the transistor P9 so that the transistor P9 has a constant transconductance as discussed for the transistor P4. A drain of the transistor P9 couples to a source of a PMOS transistor P10 that may be matched to the transistor P5. The bias voltage Vbias2 drives a gate of the transistor P10 so that the transistor P10 has a constant transconductance as discussed for the transistor P5. A drain of the transistor P10 couples to a drain of the diode-connected transistor M1.

The IDAC 400 also includes a plurality of selectable current branches ranging from a first selectable current branch 405 to a last (nth) selectable current branch, where n is the integer width of the calibration signal from the FSM 115. The remaining selectable current branches for the IDAC 400 are not shown in FIG. 4 for illustration clarity. Each selectable current branch includes PMOS transistors that are analogous to the PMOS transistors P8, P9, and P10 as discussed for the fixed current branch 415. For example, the first selectable current branch 405 includes a transistor P11 that has its source coupled to the power supply node and has its gate controlled by the complement enable signal. A drain of the transistor P11 couples to a source of a PMOS transistor P12 that may be matched to the transistor P4. The bias voltage Vbias1 drives a gate of the transistor P12 so that the transistor P12 has a constant transconductance as discussed for the transistor P4. A drain of the transistor P12 couples to a source of a PMOS transistor P13 that may be matched to the transistor P5. The bias voltage Vbias2 drives a gate of the transistor P13 so that the transistor P13 has a constant transconductance as discussed for the transistor P5. To control whether the first selectable current branch 405 conducts during the active mode, a drain of the transistor P13 couples to a source of a PMOS transistor P14 that has its gate controlled by a first bit (cal_1) of the calibration signal. Should the first bit be grounded, the first selectable current branch 405 may conduct into the drain of the diode-connected transistor M1.

The remaining selectable current branches are analogous. For example, the last selectable current branch 410 includes a transistor P15 that has its source coupled to the power supply node and has its gate controlled by the complement enable signal. A drain of the transistor P15 couples to a source of a PMOS transistor P16 that may be matched to the transistor P4. The bias voltage Vbias1 drives a gate of the transistor P16 so that the transistor P16 has a constant transconductance as discussed for the transistor P4. A drain of the transistor P16 couples to a source of a PMOS transistor P17 that may be matched to the transistor P5. The bias voltage Vbias2 drives a gate of the transistor P17 so that the transistor P17 has a constant transconductance as discussed for the transistor P5. To control whether the last selectable current branch 410 conducts during the active mode, a drain of the transistor P17 couples to a source of a PMOS transistor P18 that has its gate controlled by a last bit (cal_n) of the calibration signal. Should the last bit be grounded, the last selectable current branch 410 may conduct into the drain of the diode-connected transistor M1. Depending upon how many selectable current branches conduct, a combined current Icombined conducts through the diode-connected transistor M1 that may then be mirrored to the transistors M2, M3, and M4 as discussed with respect to the bias current generator 100.

Figure 5:
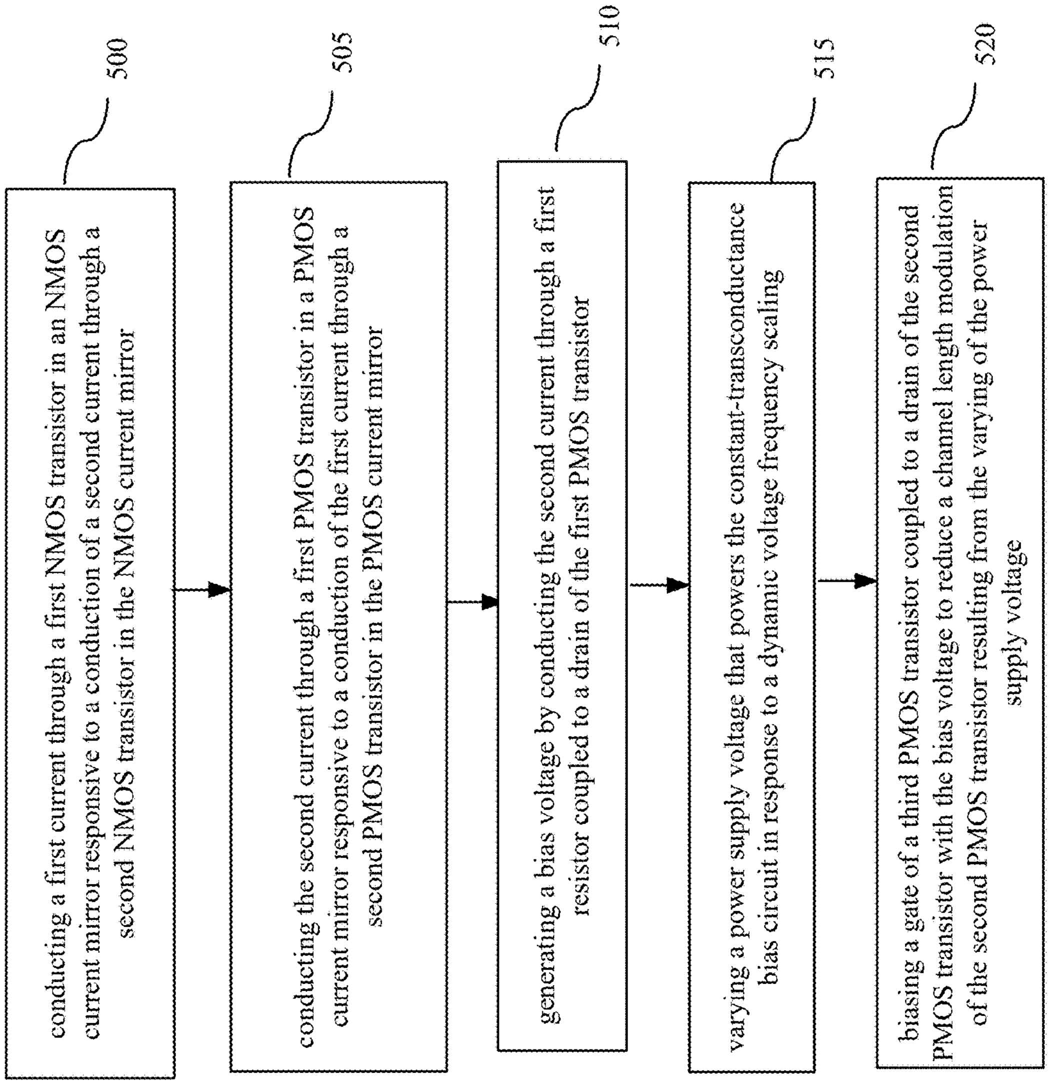
FIG. 5 is a flowchart of a method of a method of generating a bias voltage from a constant-transconductance bias circuit in accordance with an aspect of the disclosure.

A method of generating a bias voltage from a constant-transconductance bias circuit will now be discussed with reference to the flowchart of FIG. 5. The method includes an act 500 of conducting a first current through a first NMOS transistor in an NMOS current mirror responsive to a conduction of a second current through a second NMOS transistor in the NMOS current mirror. The mirroring of the current I2 by the NMOS current mirror 210 into the current I1 is an example of act 500. The method also includes an act 505 of conducting the second current through a first PMOS transistor in a PMOS current mirror responsive to a conduction of the first current through a second PMOS transistor in the PMOS current mirror. The mirroring of the current I1 by the PMOS current mirror 205 into the current I2 is an example of act 505. In addition, the method includes an act 510 of generating a bias voltage by conducting the second current through a first resistor coupled to a drain of the first PMOS transistor. The conduction of the current I1 through the resistor R3 is an example of act 510. The method also includes an act 515 of varying a power supply voltage that powers the constant-transconductance bias circuit in response to a dynamic voltage frequency scaling. The varying of the power supply voltage VDDa is an example of act 515. Finally, the method includes an act 520 of biasing a gate of a third PMOS transistor coupled to a drain of the second PMOS transistor with the bias voltage to reduce a channel length modulation of the second PMOS transistor resulting from the varying of the power supply voltage. The biasing of the gate of the transistor P5 with the bias voltage Vbias2 is an example of act 520.

Figure 6:
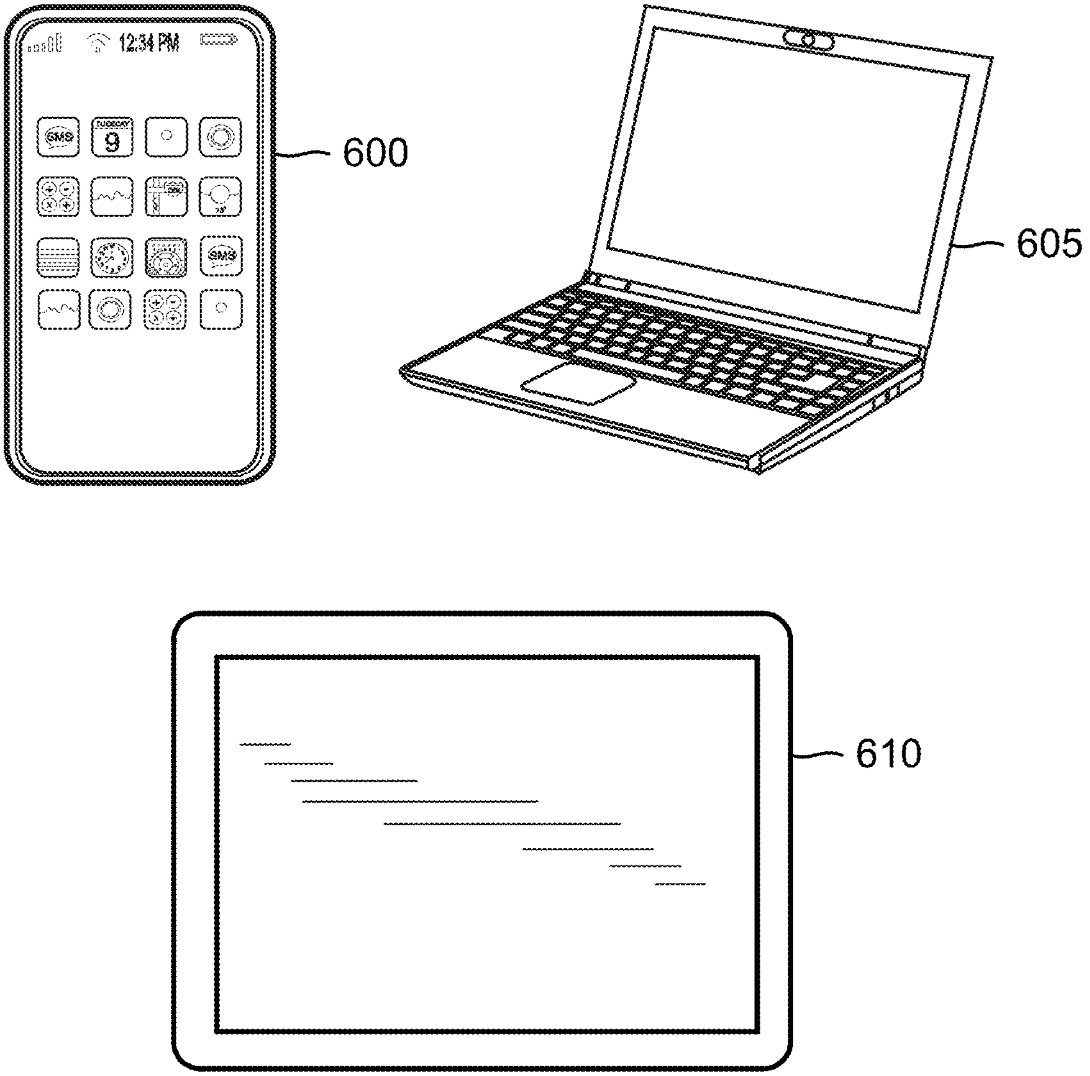
FIG. 6 illustrates some example mobile devices including a bias circuit in accordance with an aspect of the disclosure.

A constant-transconductance bias circuit as disclosed herein may be advantageously included in a variety of electronic systems. For example, as shown in FIG. 6, a cellular telephone 600, a laptop computer 605, and a tablet PC 610 may all include a bias circuit in accordance with the disclosure. Other exemplary electronic systems such as a music player, a video player, a communication device, and a personal computer may also be configured with a bias circuit in accordance with the disclosure.

The disclosure will now be summarized in the following series of clauses:

Clause 1. A constant-transconductance bias circuit, comprising:
- a p-type metal-oxide (PMOS) current mirror configured to mirror a first current into a second current, the PMOS current mirror including a first PMOS transistor and a second PMOS transistor;
- an n-type metal-oxide semiconductor (NMOS) current mirror configured to mirror the second current into the first current, the NMOS current mirror including a first NMOS transistor and a second NMOS transistor;
- a first resistor having a first terminal coupled to a drain of the second NMOS transistor;
- a third PMOS transistor coupled between a drain of the first PMOS transistor and a second terminal of the first resistor; and
- a second resistor having a first terminal coupled to a drain of the second PMOS transistor and having a second terminal coupled to a drain of the first NMOS transistor and coupled to a gate of the third PMOS transistor.

Clause 2. The constant-transconductance bias circuit of clause 1, further comprising:
- a third NMOS transistor having a gate coupled to a gate of the second NMOS transistor, wherein the second terminal of the second resistor is coupled to the drain of the first NMOS transistor through the third NMOS transistor.

Clause 3. The constant-transconductance bias circuit of clause 2, further comprising:
- a fourth PMOS transistor having a source coupled to a power supply node for a power supply voltage and having a drain coupled to a source of the second PMOS transistor; and
- a fifth PMOS transistor having a source coupled to the power supply node and having a drain coupled to a source of the first PMOS transistor, wherein the fourth PMOS transistor and the fifth PMOS transistor are both configured to switch on and off responsive to a complement of an enable signal for the constant-transconductance bias circuit.

Clause 4. The constant-transconductance bias circuit of clause 3, further comprising:
- a fourth NMOS transistor having a source coupled to ground, a drain coupled to a gate of the first PMOS transistor and to a gate of the second PMOS transistor, and a gate coupled to a gate of the fourth PMOS transistor and to a gate of the fifth PMOS transistor.

Clause 5. The constant-transconductance bias circuit of any of clauses 1-4, wherein the first PMOS transistor is diode connected.

Clause 6. The constant-transconductance bias circuit of clauses 3-4, further comprising:
- a first transmission gate coupled between a gate of the first NMOS transistor and the drain of the second NMOS transistor, wherein the first transmission gate is configured to open and close responsive to a buffered version of the enable signal and to a buffered version of the complement of the enable signal.

Clause 7. The constant-transconductance bias circuit of clause 6, further comprising:
- a sixth PMOS transistor having a source coupled to the power supply node and a drain coupled to the gate of the first NMOS transistor, wherein the sixth PMOS transistor is configured to switch on and off responsive to the buffered version of the enable signal.

Clause 8. The constant-transconductance bias circuit of clause 7, further comprising:
- a second transmission gate coupled between a gate of the third NMOS transistor and a drain of the third PMOS transistor.

Clause 9. The constant-transconductance bias circuit of clause 8, further comprising:
- a seventh PMOS transistor having a source coupled to the power supply node and a drain coupled to the gate of the third NMOS transistor, wherein the seventh PMOS transistor is configured to switch on and off responsive to the buffered version of the enable signal.

Clause 10. The constant-transconductance bias circuit of any of clauses 1-9, wherein the constant-transconductance bias circuit is included within a bias current generator including:
- a current-digital-to-analog converter including a plurality of current paths, each current path being biased by a gate voltage of the second PMOS transistor and by a gate voltage of the third PMOS transistor.

Clause 11. The constant-transconductance bias circuit of clause 10, wherein the bias current generator further includes:
- a diode-connected NMOS transistor configured to conduct a combined current from the current paths of the current-digital-to-analog converter;
- a first reference NMOS transistor having a gate coupled to a gate of the diode-connected NMOS transistor;
- a third resistor coupled between an input/output power supply node and a drain of the first reference NMOS transistor;
- a comparator configured to compare a drain voltage of the first reference NMOS transistor to a reference voltage to provide a comparator output signal; and
- a controller configured to control the current-digital-to-analog converter responsive to the comparator output signal.

Clause 12. The constant-transconductance bias circuit of any of clauses 1-11, wherein the constant-transconductance bias circuit is included a cellular telephone.

Clause 13. A method of generating a bias voltage from a constant-transconductance bias circuit, comprising:

conducting a first current through a first NMOS transistor in an NMOS current mirror responsive to a conduction of a second current through a second NMOS transistor in the NMOS current mirror;

conducting the second current through a first PMOS transistor in a PMOS current mirror responsive to a conduction of the first current through a second PMOS transistor in the PMOS current mirror;

generating a bias voltage by conducting the second current through a first resistor coupled to a drain of the first PMOS transistor;

varying a power supply voltage that powers the constant-transconductance bias circuit in response to a dynamic voltage frequency scaling; and biasing a gate of a third PMOS transistor coupled to a drain of the second PMOS transistor with the bias voltage to reduce a channel length modulation of the second PMOS transistor resulting from the varying of the power supply voltage.

Clause 14. The method of clause 13, further comprising, biasing a gate of a third NMOS transistor coupled between the first resistor and a drain of the first NMOS transistor with a drain voltage of the third PMOS transistor to reduce a channel length modulation of the first NMOS transistor resulting from the varying of the power supply voltage.

Clause 15. The method of clause 14, further comprising:

switching off a fourth PMOS transistor coupled between a source of the second PMOS transistor and a power supply node for the power supply voltage while switching off a fifth PMOS transistor coupled between a source of the first PMOS transistor and the power supply node to prevent the first current and the second current from conducting during an inactive mode; and grounding a gate of the first PMOS transistor and a gate of the second PMOS transistor during the inactive mode.

Clause 16. The method of clause 14, further comprising: generating a calibrated current responsive to a generation of the bias voltage.

Clause 17. A bias circuit, comprising:

a PMOS current mirror configured to mirror a first current into a second current, the PMOS current mirror including a first PMOS transistor and a second PMOS transistor;

an NMOS current mirror configured to mirror the second current into the first current, the NMOS current mirror including a first NMOS transistor and a second NMOS transistor;

a first resistor coupled between a gate of the second NMOS transistor and a drain of the second NMOS transistor; and a third NMOS transistor coupled between a drain of the first NMOS transistor and a drain and a gate of the second PMOS transistor, wherein a gate of the third NMOS transistor is coupled to the gate of the second NMOS transistor.

Clause 18. The bias circuit of clause 17, further comprising:

a third PMOS transistor coupled between the first resistor and a drain of the first PMOS transistor.

Clause 19. The bias circuit of any of clauses 17-18, further comprising:

a first transmission gate coupled between the gate of the first NMOS transistor and the drain of the second NMOS transistor.

Clause 20. The bias circuit of clause 19, further comprising:

a second transmission gate coupled between the gate of the second NMOS transistor and the first resistor.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

We claim:

1. A constant-transconductance bias circuit, comprising:

a p-type metal-oxide (PMOS) current mirror configured to mirror a first current into a second current, the PMOS current mirror including a first PMOS transistor and a second PMOS transistor;

an n-type metal-oxide semiconductor (NMOS) current mirror configured to mirror the second current into the first current, the NMOS current mirror including a first NMOS transistor and a second NMOS transistor;

a first resistor having a first terminal coupled to a drain of the second NMOS transistor;

a third PMOS transistor coupled between a drain of the first PMOS transistor and a second terminal of the first resistor; and a second resistor having a first terminal coupled to a drain of the second PMOS transistor and having a second terminal coupled to a drain of the first NMOS transistor and coupled to a gate of the third PMOS transistor, wherein the constant-transconductance bias circuit is included within a bias current generator including a current-digital-to-analog converter including a plurality of current paths, each current path being biased by a gate voltage of the second PMOS transistor and by a gate voltage of the third PMOS transistor.

2. The constant-transconductance bias circuit of claim 1, further comprising:

a third NMOS transistor having a gate coupled to a gate of the second NMOS transistor, wherein the second terminal of the second resistor is coupled to the drain of the first NMOS transistor through the third NMOS transistor.

3. The constant-transconductance bias circuit of claim 2, further comprising:

a fourth PMOS transistor having a source coupled to a power supply node for a power supply voltage and having a drain coupled to a source of the second PMOS transistor; and a fifth PMOS transistor having a source coupled to the power supply node and having a drain coupled to a source of the first PMOS transistor, wherein the fourth PMOS transistor and the fifth PMOS transistor are both configured to switch on and off responsive to a complement of an enable signal for the constant-transconductance bias circuit.

4. The constant-transconductance bias circuit of claim 3, further comprising:

a fourth NMOS transistor having a source coupled to ground, a drain coupled to a gate of the first PMOS transistor and to a gate of the second PMOS transistor, and a gate coupled to a gate of the fourth PMOS transistor and to a gate of the fifth PMOS transistor.

5. The constant-transconductance bias circuit of claim 1, wherein the second PMOS transistor is diode connected.

6. The constant-transconductance bias circuit of claim 3, further comprising:

a first transmission gate coupled between a gate of the first NMOS transistor and the drain of the second NMOS transistor, wherein the first transmission gate is configured to open and close responsive to a buffered version of the enable signal and to a buffered version of the complement of the enable signal.

7. The constant-transconductance bias circuit of claim 6, further comprising:

a sixth PMOS transistor having a source coupled to the power supply node and a drain coupled to the gate of the first NMOS transistor, wherein the sixth PMOS transistor is configured to switch on and off responsive to the buffered version of the enable signal.

8. The constant-transconductance bias circuit of claim 7, further comprising:

a second transmission gate coupled between a gate of the third NMOS transistor and a drain of the third PMOS transistor.

9. The constant-transconductance bias circuit of claim 8, further comprising:

a seventh PMOS transistor having a source coupled to the power supply node and a drain coupled to the gate of the third NMOS transistor, wherein the seventh PMOS transistor is configured to switch on and off responsive to the buffered version of the enable signal.

10. The constant-transconductance bias circuit of claim 1, wherein the bias current generator further includes:

a diode-connected NMOS transistor configured to conduct a combined current from the current paths of the current-digital-to-analog converter;

a first reference NMOS transistor having a gate coupled to a gate of the diode-connected NMOS transistor;

a third resistor coupled between an input/output power supply node and a drain of the first reference NMOS transistor;

a comparator configured to compare a drain voltage of the first reference NMOS transistor to a reference voltage to provide a comparator output signal; and a controller configured to control the current-digital-to-analog converter responsive to the comparator output signal.

11. The constant-transconductance bias circuit of claim 1, wherein the constant-transconductance bias circuit is included within an integrated circuit of a cellular telephone.

12. A method of generating a bias voltage from a constant-transconductance bias circuit, comprising:

conducting a first current through a first NMOS transistor in an NMOS current mirror responsive to a conduction of a second current through a second NMOS transistor in the NMOS current mirror;

conducting the second current through a first PMOS transistor in a PMOS current mirror responsive to a conduction of the first current through a second PMOS transistor in the PMOS current mirror;

generating a bias voltage by conducting the second current through a first resistor coupled to a drain of the second PMOS transistor;

varying a power supply voltage that powers the constant-transconductance bias circuit in response to a dynamic voltage frequency scaling;

biasing a gate of a third PMOS transistor coupled to a drain of the first PMOS transistor with the bias voltage to reduce a channel length modulation of the first PMOS transistor resulting from the varying of the power supply voltage;

coupling the drain of the second NMOS transistor to a drain of the third PMOS transistor through a second resistor;

opening and closing a first transmission gate coupled between a gate of the first NMOS transistor and the drain of the second NMOS transistor responsive to a buffered version of an enable signal and to a buffered version of a complement of the enable signal;

opening and closing a second transmission gate coupled between a gate of a third NMOS transistor and a drain of the third PMOS transistor responsive to a buffered version of an enable signal and to a buffered version of a complement of the enable signal, wherein the third NMOS transistor has a gate coupled to a gate of the second NMOS transistor; and switching on and off a sixth PMOS transistor having a source coupled to a power supply node and a drain coupled to the gate of the first NMOS transistor responsive to the buffered version of the enable signal.

13. The method of claim 12, further comprising, biasing a gate of a third NMOS transistor coupled between the first resistor and a drain of the first NMOS transistor with a drain voltage of the third PMOS transistor to reduce a channel length modulation of the first NMOS transistor resulting from the varying of the power supply voltage.

14. The method of claim 13, further comprising:

switching off a fourth PMOS transistor coupled between a source of the second PMOS transistor and a power supply node for the power supply voltage while switching off a fifth PMOS transistor coupled between a source of the first PMOS transistor and the power supply node to prevent the first current and the second current from conducting during an inactive mode; and grounding a gate of the first PMOS transistor and a gate of the second PMOS transistor during the inactive mode.

15. The method of claim 13, further comprising:

generating a calibrated current responsive to a generation of the bias voltage.

16. The method of claim 12, further comprising switching on and off a seventh PMOS transistor having a source coupled to the power supply node and a drain coupled to the gate of the third NMOS transistor responsive to the buffered version of the enable signal.

17. A bias circuit, comprising:

a PMOS current mirror configured to mirror a first current into a second current, the PMOS current mirror including a first PMOS transistor and a second PMOS transistor;

an NMOS current mirror configured to mirror the second current into the first current, the NMOS current mirror including a first NMOS transistor and a second NMOS transistor;

a first resistor coupled between a gate of the second NMOS transistor and a drain of the second NMOS transistor;

a third NMOS transistor coupled between a drain of the first NMOS transistor and a drain and a gate of the second PMOS transistor, wherein a gate of the third NMOS transistor is coupled to the gate of the second NMOS transistor;

a first transmission gate coupled between the gate of the first NMOS transistor and the drain of the second NMOS transistor; and a second transmission gate coupled between the gate of the second NMOS transistor and the first resistor.

18. The bias circuit of claim 17, further comprising:

a third PMOS transistor coupled between the first resistor and a drain of the first PMOS transistor.

19. The bias circuit of claim 17, wherein the second PMOS transistor is diode connected.

20. The bias circuit of claim 17, further comprising:

a sixth PMOS transistor having a source coupled to a power supply node and a drain coupled to the gate of the first NMOS transistor, wherein the sixth PMOS transistor is configured to switch on and off responsive to a buffered version of an enable signal; and a seventh PMOS transistor having a source coupled to the power supply node and a drain coupled to the gate of the third NMOS transistor, wherein the seventh PMOS transistor is configured to switch on and off responsive to the buffered version of the enable signal.

* * * * *